United States Patent
Audley

(10) Patent No.: US 10,181,944 B2
(45) Date of Patent: Jan. 15, 2019

(54) MINIMIZING INFORMATION LEAKAGE DURING MODULAR EXPONENTIATION AND ELLIPTIC CURVE POINT MULTIPLICATION

(71) Applicant: The Athena Group, Inc., Gainesville, FL (US)

(72) Inventor: Stuart Audley, Gainesville, FL (US)

(73) Assignee: THE ATHENA GROUP, INC., Gainesville, FL (US)

(*) Notice: Subject to any disclaimer, the term of this patent is extended or adjusted under 35 U.S.C. 154(b) by 70 days.

(21) Appl. No.: 15/184,653

(22) Filed: Jun. 16, 2016

(65) Prior Publication Data

US 2016/0373248 A1    Dec. 22, 2016

Related U.S. Application Data

(60) Provisional application No. 62/180,465, filed on Jun. 16, 2015.

(51) Int. Cl.
    *H04L 9/00* (2006.01)
    *G06F 21/75* (2013.01)

(52) U.S. Cl.
    CPC .............. *H04L 9/002* (2013.01); *G06F 21/75* (2013.01)

(58) Field of Classification Search
    CPC ....... H04L 9/002; H04L 9/003; H04L 9/3066; H04L 9/0618; H04L 9/0869
    See application file for complete search history.

(56) References Cited

U.S. PATENT DOCUMENTS

| | | |
|---|---|---|
| 6,298,442 B1 | 10/2001 | Kocher et al. |
| 6,304,658 B1 | 10/2001 | Kocher et al. |
| 6,327,661 B1 | 12/2001 | Kocher et al. |
| 6,567,832 B1 * | 5/2003 | Ono .................. G06F 7/723 708/606 |
| 6,876,745 B1 | 4/2005 | Kurumatani |
| 6,973,190 B1 | 12/2005 | Goubin |
| 7,046,801 B2 | 5/2006 | Okeya |
| 7,162,033 B1 | 1/2007 | Coron |
| 7,308,096 B2 | 12/2007 | Okeya et al. |
| 7,864,951 B2 | 1/2011 | Al-Gahtani et al. |
| 7,908,641 B2 | 3/2011 | Fischer |
| 8,265,266 B2 | 9/2012 | Ciet et al. |
| 8,619,977 B2 | 12/2013 | Douguet et al. |
| 8,767,955 B2 | 7/2014 | Teglia |

(Continued)

OTHER PUBLICATIONS

Coron, J.-S.: "Resistance Against Differential Analysis for Elliptic Curve Cryptography," Advances in Cryptology—CHES'99, vol. 1717 of LNCS, pp. 292-302. (Springer-Verlag, 1999.).

(Continued)

*Primary Examiner* — Ghazal B Shehni
(74) *Attorney, Agent, or Firm* — Saliwanchik, Lloyd & Eisenschenk

(57) ABSTRACT

Minimizing information leakage during modular exponentiation using random masks is disclosed Minimizing information leakage during elliptic curve point multiplication is disclosed with windowing by using point randomization is disclosed. Elliptic curve point multiplication with windowing calculates and stores multiple points based on the point being multiplied and then processes multiple bits of the multiplier at a time is also disclosed.

4 Claims, 5 Drawing Sheets

(56) References Cited

U.S. PATENT DOCUMENTS

2007/0177721 A1* 8/2007 Itoh .................. G06F 7/723
   380/28
2008/0044010 A1* 2/2008 Vasyltasov .......... G06F 7/725
   380/28

OTHER PUBLICATIONS

Okeya, T. and Takagi, T.: "The Width-w NAF Method Provides Small Memory and Fast Elliptic Scalar Multiplications Secure against Side Channel Attacks," Topics in Cryptology—CT-RSA 2003, pp. 328-343. (Springer Berlin Heidelberg, 2003.)

* cited by examiner

MINIMIZING INFORMATION LEAKAGE DURING MODULAR EXPONENTIATION AND ELLIPTIC CURVE POINT MULTIPLICATION

PRIORITY

This application claims the benefit of and priority to U.S. Provisional Patent Application Ser. No. 62/180,465, filed Jun. 16, 2015, which is incorporated herein by this reference in its entirety.

TECHNICAL FIELD

Embodiments of this invention relate generally to integrated circuits (ICs) and, more particularly, to a system for processing and/or storing sensitive data that may, should, or must be kept secure.

BACKGROUND

Integrated circuits take a multitude forms, including digital memory chips, microprocessors, application specific integrated circuits (ASICs), application specific standard products (ASSPs), field-programmable gate arrays (FPGAs), hardware security modules (HSMs), and more. For many systems containing ICs, it is important to protect the electronically stored and/or processed data, including, but not limited to, computer access control, military weapons systems, medical information, vehicle control, secure communications, and payment transaction processing. The security for the data these systems process often relies on cryptographic operations based on secret keys stored in memory or other circuitry, which are then used to cryptographically secure sensitive data from unauthorized access.

Information leaked from cryptographic circuits can be analyzed to determine keys or other secret data being processed. The present invention provides methods and apparatuses to reduce information leakage during modular exponentiation and/or elliptic curve point multiplication.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

The detailed description makes reference to the accompanying figures in which.

DETAILED DESCRIPTION OF THE DRAWINGS

Figure 1:
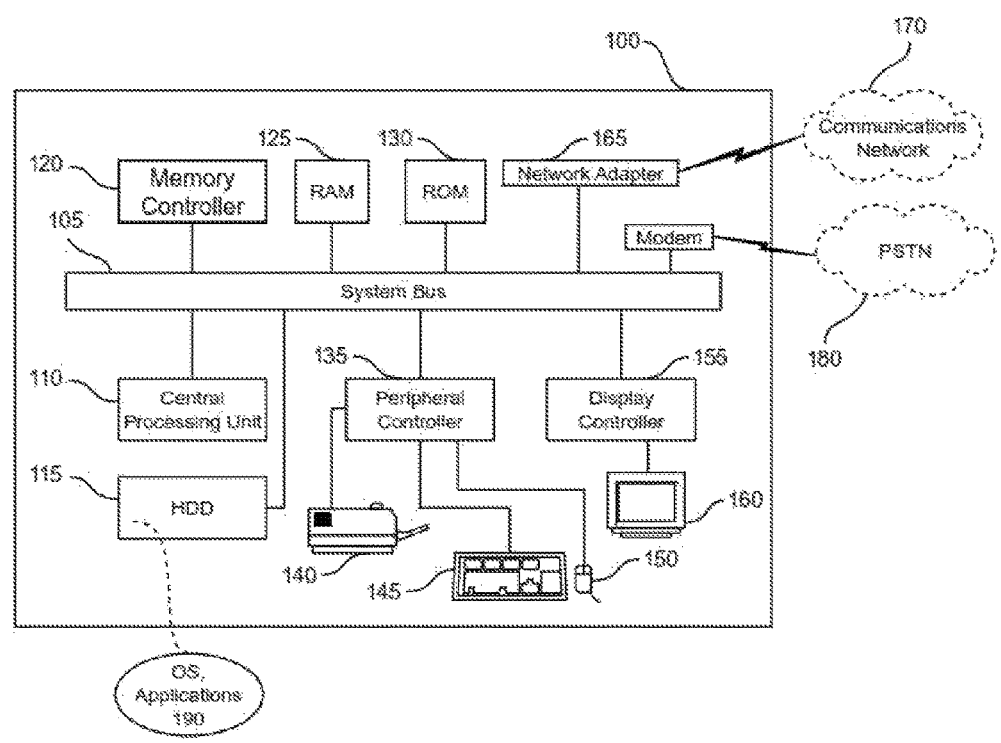
FIG. 1 illustrates an aspect of an exemplary embodiment of the present invention.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

An exemplary logical computing system may be used in accordance with herein described systems and methods. Logical computing system is capable of executing logic on received instructions or data, such as using hardware and/or software. The logic may be supplied in the form of logic gates, electronic components, and/or the like, or in the form of a computer readable storage medium suitable to store programming indicative of the logic, such as may be executed by a processor.

FIG. 1 depicts an exemplary computing system 100 for use in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output and/or presentation generated by or at the request of computing system 100. Such visual output may include text, graphics, animated graphics, and/or video, for example. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet. Communications network 170 may provide user access for computing system 100 with means of communicating and transferring software and information electronically. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
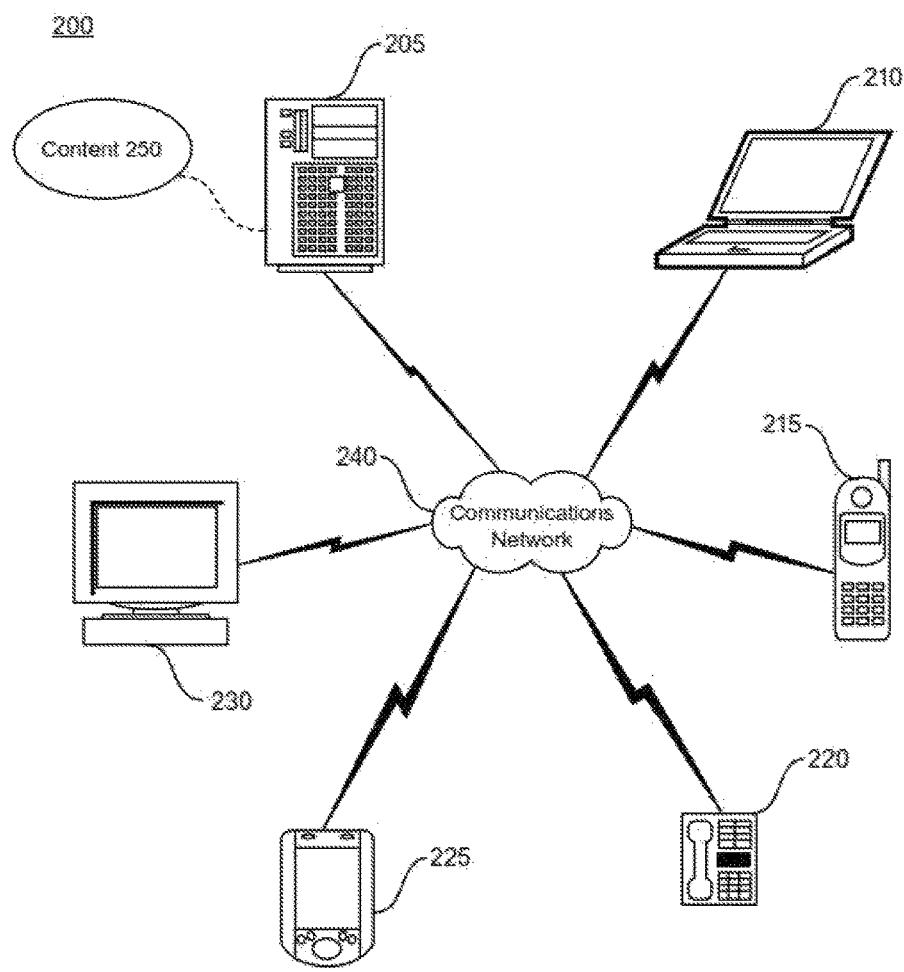
FIG. 2 illustrates an aspect of another exemplary embodiment of the present invention.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

In the following examples, such logical computing systems and associated logical computing methods may perform novel and non-obvious manipulations and calculations in order to reduce information leakage during modular exponentiation and elliptic curve point multiplication.

EXAMPLE 1

Figure 3:
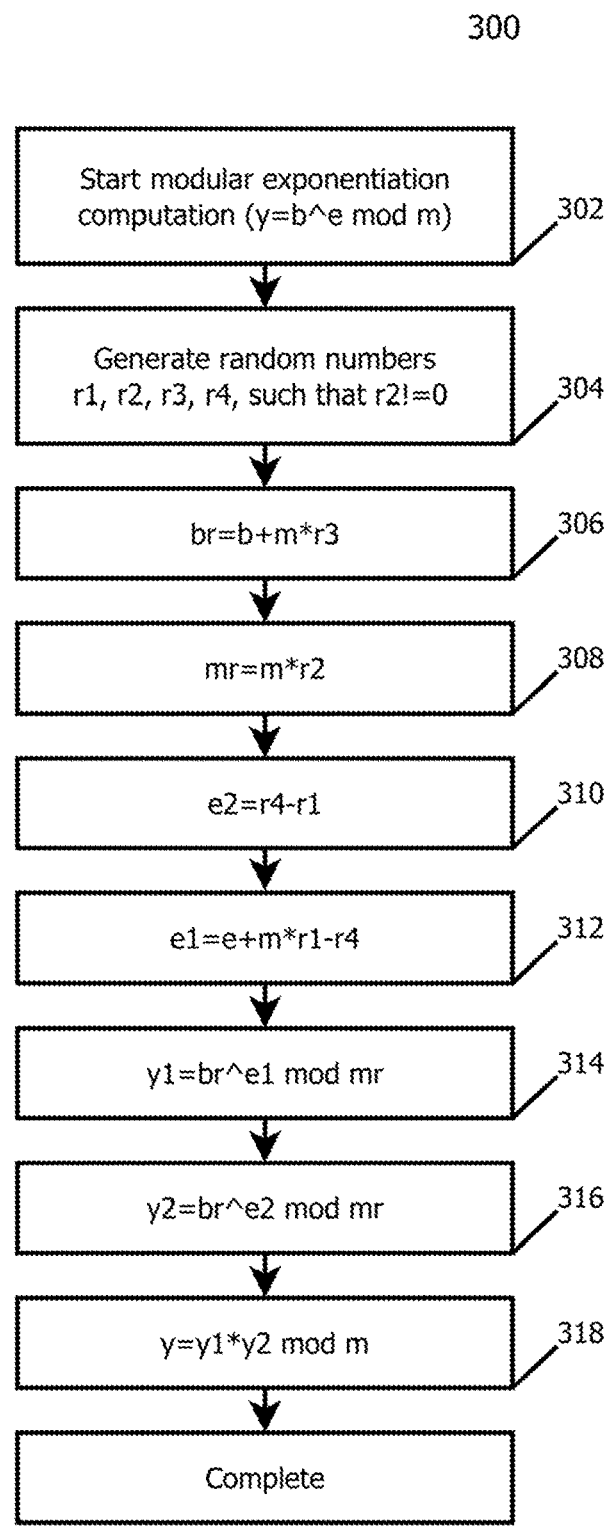
FIG. 3 is a simplified workflow diagram of a first embodiment of the present invention.

With reference to FIG. 3, the following process 300 minimizes information leakage during modular exponentiation using random masks. Assuming the modulus is prime where b is the base, e is the exponent, and m is the modulus (Step 302). Moving to Step 304, four random numbers of any bit width may be generated and used for masking: r1, r2, r3, and r4. At least one of the random numbers may be ensured to be non-zero, for example r2. Moving to Step 306, a randomized base may be computed as br=b+m*r3. Moving to Step 308, a randomized modulus may be computed as mr=m*r2. Moving to Step 310, a randomized exponent 2 may be computed as e2=r4-r1 Moving to Step 312, a randomized exponent 1 may be computed as e1=e+m*r1-r4. Moving to Step 314, a modular exponentiation may be performed with the randomized base, randomized modulus, and the randomized exponent 1, y1=br^e1 mod mr. Moving to Step 316, a modular exponentiation may be performed with the randomized base, randomized modulus, and the randomized exponent 2, y2=br^e2 mod mr. Moving to Step 318, the result, y, may be stored as the product of y1 and y2 and reduced by the modulus m. The method is then considered complete. The results of the two modular exponentiations may be used as a modular multiplicative masked share for the modular exponentiation result. The results of the two modular exponentiations may be combined by computing the modular multiplication of the two results modulo m to obtain the unmasked modular exponentiation result, y=y1*y2 mod m.

EXAMPLE 2

The following method minimizes information leakage during elliptic curve point multiplication by efficiently combining elliptic curve multiplier order randomization and multiplier splitting. Elliptic curve multiplier order randomization [1] adds a multiple of the order of the curve to the multiplier to create a functionally equivalent randomized multiplier. Given d is the scalar multiplier, X is the point being multiplied, n is the order of the elliptic curve belonging to X, and Y=dX, then Y=(d+n*r)X, because nX=O (point at infinity). Elliptic curve multiplier splitting [2] creates multiple shares of the multiplier such that dX=d1X+d2X, where d1=d-r and d2=r.

Figure 4:
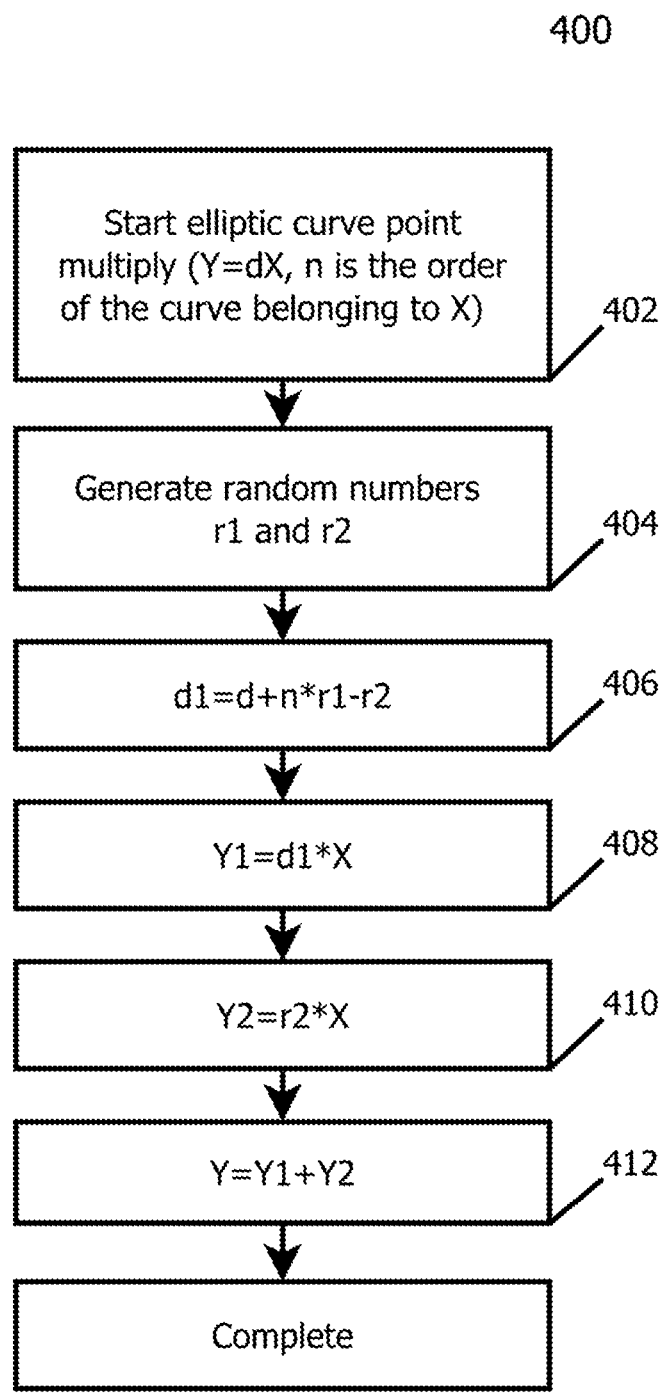
FIG. 4 is a simplified workflow diagram of a second embodiment of the present invention.

With reference to FIG. 4, the process 400 shows the efficient combination of randomization and splitting. The process starts with an elliptic curve point multiply request (Y=dX, n is the order of the curve belonging to X). Two random numbers of any bit width may be generated and used for masking: r1 and r2 (Step 404). The random multiplier 1, d1, may be stored as d+n*r1-r2 (Step 406). The intermediate result point 1, Y1, may be stored as the resulting point from an elliptic curve point multiply with the multiplier, d1, and point, X (408). The intermediate result point 2, Y2, may be stored as the resulting point from an elliptic curve point multiply with the multiplier, r2, and point, X (Step 410). The resulting point, Y, may be stored as the point addition of Y1 and Y2 (Step 412) where Y=Y1+Y2=dX. The process then completes.

EXAMPLE 3

The following method minimizes information leakage during elliptic curve point multiplication with windowing by using point randomization. Elliptic curve point multiplication with windowing calculates and stores multiple points based on the point being multiplied and then processes multiple bits of the multiplier at a time [4]. Projective randomization updates a projective point {x,y,z} with a new value { x*r,y*r,z*r} where r may be non-zero[1]. Jacobian randomization updates a Jacobian point {x,y,z} with a new value {x*r^2,y*r^3,z*r} where r may be non-zero[3].

Figure 5:
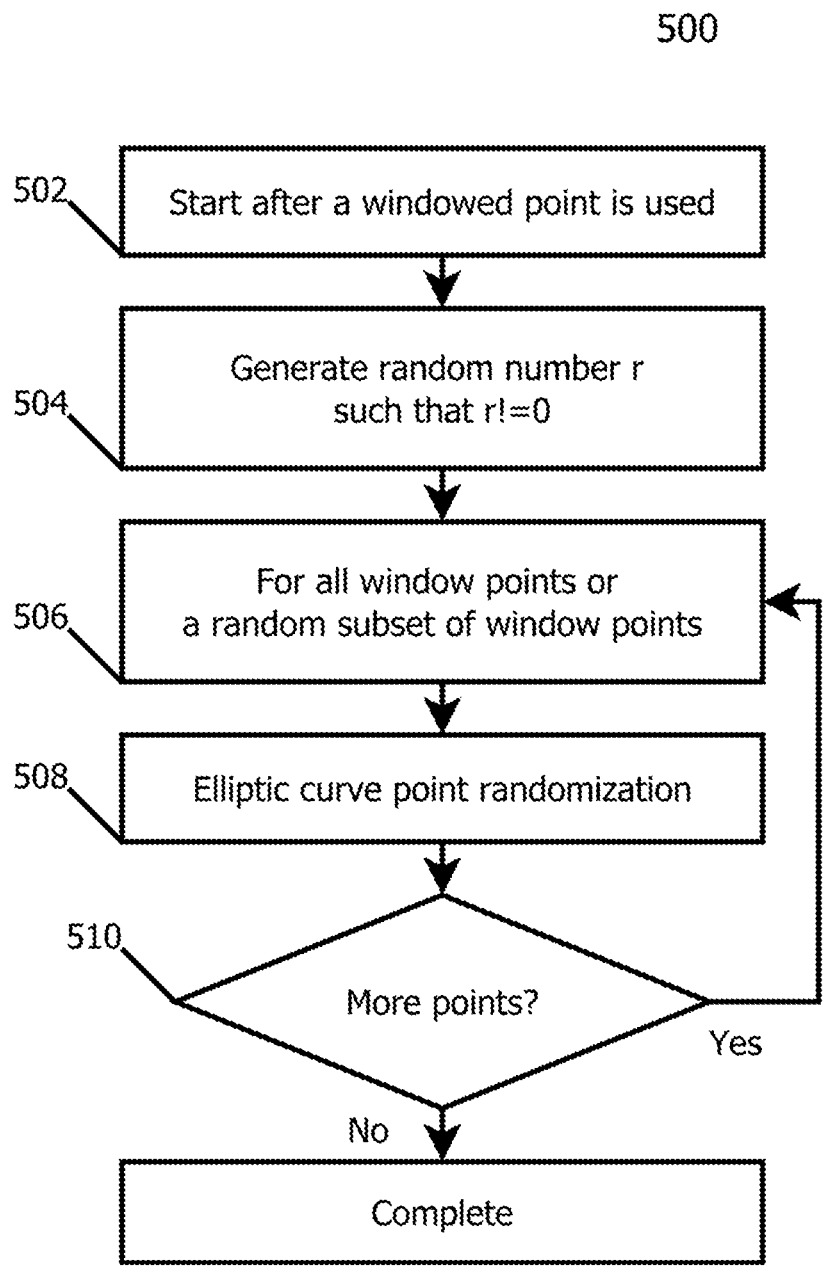
FIG. 5 is a simplified workflow diagram of a third embodiment of the present invention.

With reference to FIG. 5, the process 500 performs elliptic curve point randomization on all or a random selection of window points after any windowed point is used (Step 502). In Step 504, a random number r may be generated, such r may be non-zero. In Step 506, for all window points or a random subset of window point, elliptic curve point randomization may be performed (Step 508). By performing point randomization on all or a random selection of window points, data leakage from the selected point in the window used in the point add may be reduced compared to only performing point randomization on the selected point. Elliptic curve point randomization is performed as long as more points are available (Step 510). When it is determined that there are no more points, More Points=No, the process is complete. The windowed elliptic curve points may be represented in projective form and projective point randomization may be used. The windowed elliptic curve points may be represented in Jacobian form and Jacobian point randomization may be used.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

The invention claimed is:

1. A method for minimizing information leakage during modular exponentiation using random masks where b is the base, e is the exponent, and m is the modulus, the method comprising:
   providing a processor,
   wherein the processor is configured to:
      generate at least four random numbers for masking, where the random numbers are r1, r2, r3, and r4, wherein the at least four random numbers are of any bit width and r2 is non-zero;
      compute a randomized base (br), where br=b+m*r3;
      compute a randomized modulus (mr), where mr=m*r2;
      compute a first randomized exponent (e1), where e1=e+m*r1-r4;
      compute a second randomized exponent (e2), where e2=r4-r1;
      determine a first modular exponentiation, y1, with the randomized base, the randomized modulus and the first randomized exponent y1=br^e1 mod mr;
      determine a second modular exponentiation, y2 with the randomized base, randomized modulus, and the second randomized exponent, y2=br^e2 mod mr; and
      wherein the modulus is prime;
   generating the at least four random numbers for masking, where the random numbers are r1, r2, r3, and r4, wherein the at least four random numbers are of any bit width and r2 is non-zero;
   computing the randomized base (br), where br=b+m*r3;
   computing the randomized modulus (mr), where mr=m*r2;
   computing the first randomized exponent (e1), where e1=e+m*r1-r4;
   computing the second randomized exponent (e2), where e2=r4-r1;
   determining the first modular exponentiation, y1, with the randomized base, the randomized modulus, and the first randomized exponent, y1=br^e1 mod mr;

determining the second modular exponentiation, y2 with the randomized base, randomized modulus, and the second randomized exponent, y2=br^e2 mod mr; and wherein the modulus is prime.

2. The method of claim 1,
wherein the results of the two modular exponentiations are used as a modular multiplicative masked share for the modular exponentiation result.

3. The method of claim 1,
wherein the results of the two modular exponentiations are combined by computing the modular multiplication of the two results modulo m to obtain the unmasked modular exponentiation result, y=y1*y2 mod m.

4. A method for minimizing information leakage during elliptic curve point multiplication, the method comprising:
providing a processor,
wherein the processor is configured to:
combine elliptic curve multiplier order randomization and multiplier splitting,
generate at least two random numbers of any bit width (r1 and r2) and used for making;
store a first random multiplier (d1) as d+n*r1−r2;
store a first intermediate result point (Y1) as a resulting point from an elliptic curve point multiply with multiplier (d1) and point X;
store a second intermediate result point (Y2) as a resulting point from an elliptic curve point multiply with multiplier (r2) and point X; and
store a resulting point Y as a point addition of Y1 and Y2 where Y=Y1+Y2=dX;
combining elliptic curve multiplier order randomization and multiplier splitting,
generating the at least two random numbers of any bit width (r1 and r2) and used for making;
storing the first random multiplier (d1) as d+n*r1−r2;
storing the first intermediate result point (Y1) as the resulting point from the elliptic curve point multiply with multiplier (d1) and point X;
storing the second intermediate result point (Y2) as the resulting point from the elliptic curve point multiply with multiplier (r2) and point X; and
storing the resulting point Y as the point addition of Y1 and Y2 where Y=Y1+Y2=dX.

* * * * *